United States Patent
Broom

[19]

[11] Patent Number: 6,161,633
[45] Date of Patent: Dec. 19, 2000

[54] APPARATUS FOR BORING THROUGH A SOLID MATERIAL

[75] Inventor: Gilbert R. Broom, Schererville, Ind.

[73] Assignee: Cutting Edge Technology, Remington, Ind.

[21] Appl. No.: 09/018,244

[22] Filed: Feb. 3, 1998

[51] Int. Cl.[7] .............................. E21B 17/16; E21B 21/00
[52] U.S. Cl. ............................ 175/320; 175/420; 408/59
[58] Field of Search .................................. 175/414, 420, 175/320; 403/34, 37, 343; 408/57, 58, 59; 138/89.4

[56] References Cited

U.S. PATENT DOCUMENTS

| | | | |
|---|---|---|---|
| 1,463,848 | 8/1923 | Shimin | 175/420 |
| 1,477,855 | 12/1923 | Thurston | 175/320 |
| 1,534,850 | 4/1925 | Hamilton | 138/89.4 |
| 1,637,332 | 8/1927 | Bronson | 138/89.4 |
| 1,943,880 | 1/1934 | Rea . | |
| 2,952,270 | 9/1960 | Fulton et al. | 403/343 |
| 3,554,306 | 1/1971 | Wilburn . | |
| 4,113,405 | 9/1978 | Dillinger . | |
| 4,852,672 | 8/1989 | Behrens | 175/320 |
| 4,895,349 | 1/1990 | Broom . | |
| 4,911,729 | 3/1990 | Rooker . | |
| 5,020,780 | 6/1991 | Woodings . | |
| 5,704,740 | 1/1998 | Ebenhoch et al. | 408/59 |
| 6,035,953 | 3/2000 | Rear | 175/320 |

FOREIGN PATENT DOCUMENTS

| | | |
|---|---|---|
| 383 737 | 5/1990 | European Pat. Off. . |
| 3025890 A1 | 1/1982 | Germany . |
| 13399 | 5/1906 | United Kingdom ................... 175/420 |
| 1470064 | 4/1977 | United Kingdom . |
| 1564473 | 4/1980 | United Kingdom . |
| 2120156 | 11/1983 | United Kingdom . |
| 95/29030 | 2/1995 | WIPO . |

OTHER PUBLICATIONS

McMaster–Carr Supply Company–Catalog 99 (Wood Boring Bits, pp. 1837–1842) No Date.

*Primary Examiner*—Brian L. Johnson
*Assistant Examiner*—Joselynn Sliteris
*Attorney, Agent, or Firm*—Wallenstein & Wagner

[57] ABSTRACT

A rotary drill bit for boring a hole through a solid body is disclosed. The drill bit comprises a collar and a penetrating member. At a proximal end, the collar is attachable to a drill shaft. At a distal end, the collar is attachable to the penetrating member. The penetrating member has a connecting end for attachment to the collar and a cutting end for engaging the solid body. A pilot drill is fixedly attached to the cutting end for initiating contact with the solid body.

15 Claims, 2 Drawing Sheets

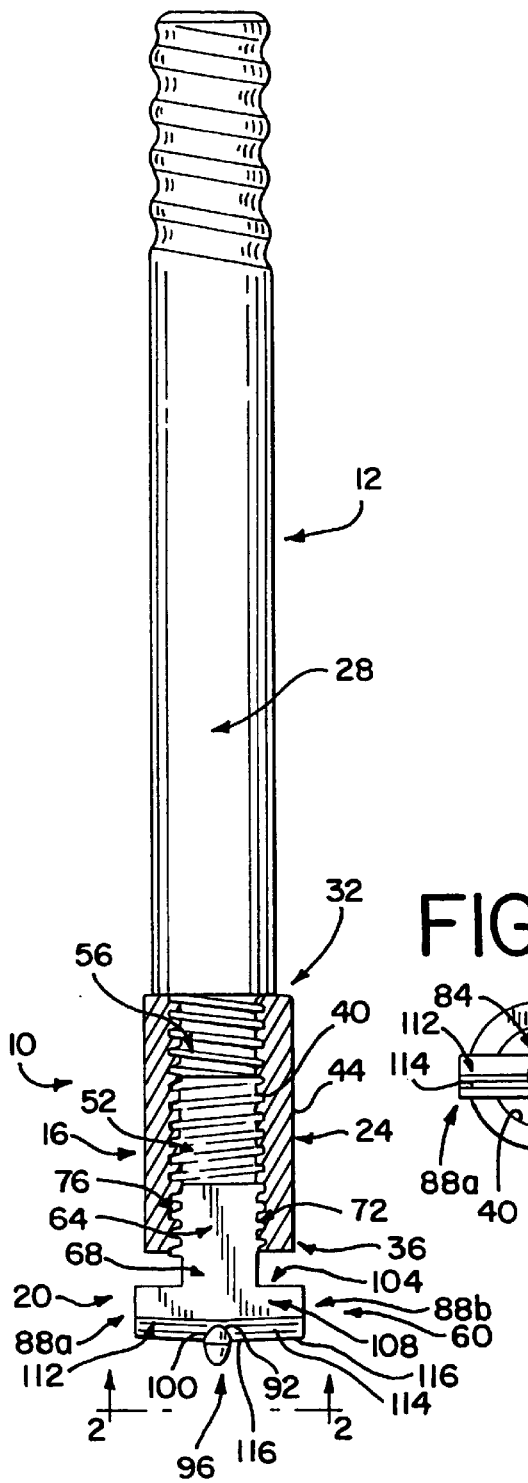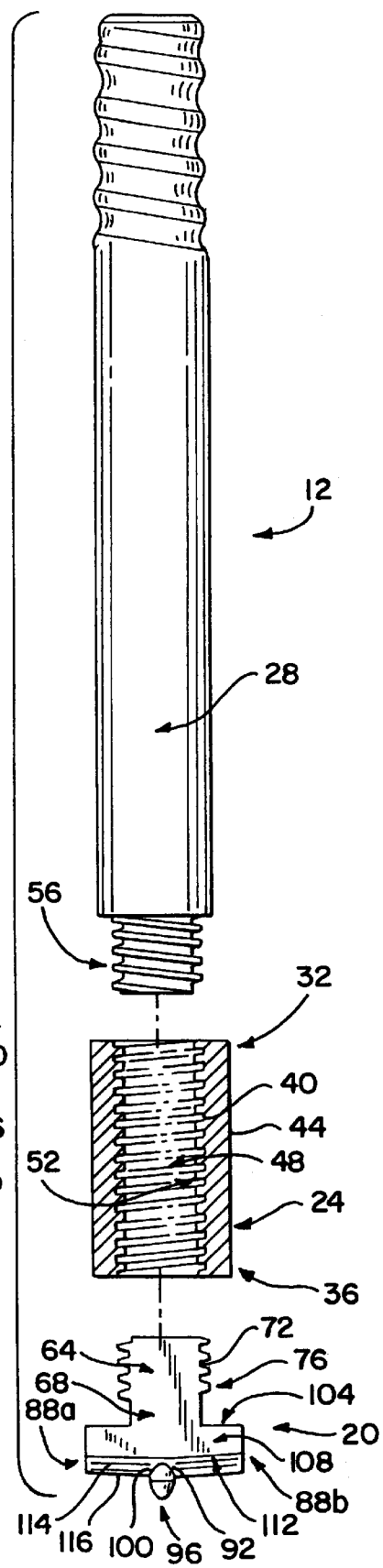

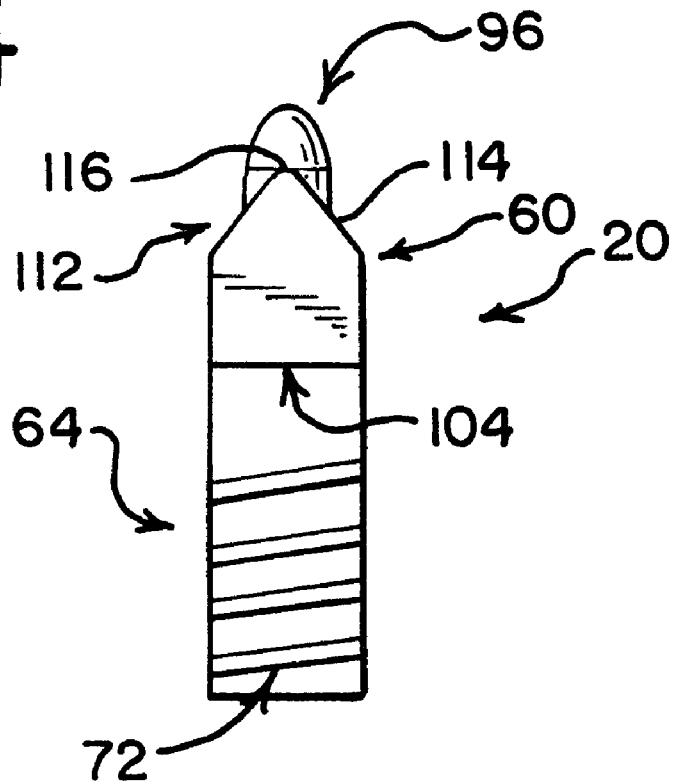

APPARATUS FOR BORING THROUGH A SOLID MATERIAL

TECHNICAL FIELD

The present invention relates to a method and apparatus for boring through a solid body. More particularly, the invention relates to an improved rotary drill bit for boring holes with increased efficiency through difficult to penetrate materials.

BACKGROUND ART

There are different drill bits for drilling through a variety of solid materials. Many of these drill bits are designed for particular applications. For instance, drill bits have been designed to drill through wood, metal, and concrete. In order to drill through these different materials, designers have varied the material used to produce the drill bits, the shape of the drill bits, and the speed with which the drill bit is operated.

One problem that exists with many drill bits is that the rate at which they will drill a hole is too slow. When the material to be drilled is difficult to penetrate, the process of boring a hole may take as long as several minutes. It is often important to maximize the efficiency at which a hole can be bored into a given material in order to improve manufacturing productivity. Such is the case in drilling tap holes in metal purifying blast furnaces.

The first step in producing steel sheet which is used in the building and construction industry, the automotive industry, the appliance industry, the electric motor industry, etc. is to produce relatively pure iron from iron ore. This process is carried out within a blast furnace. In order to maximize the productivity of a steelmaking facility, as much pare iron as possible must be produced. Many resources are expended in developing methods and procedures to increase the amount of pure iron which can be produced annually.

In developing these methods and procedures, every manufacturing variable in the blast furnace process is optimized. One of these variables is the rate at which the blast furnace can be tapped to drain molten iron from the furnace. A typical blast furnace is tapped from seven to twelve times per day seven days per week. The typical blast furnace tap hole takes several minutes to drill. In fact, some tap holes take as long as 15 minutes to drill.

The rate at which the tap hole is drilled is adversely affected by drill bit "walking." Walking occurs when as the drill bit first meets the material to be drilled, it slides or skids laterally rather than boring into the material. Therefore, drill bit walking prevents the drill operator from initiating the drilling process.

The drilling process is also slowed by drill bit binding. Binding occurs when loosened debris that is created in the drilling process builds within the hole. The debris accumulates around the drill bit and freezes the drill bit within the hole preventing the drill bit from rotating within the hole.

In order to solve some of thee problems, certain drill bits have been designed which have air passages. Pressurized air is forced through the passages toward the drill bit/solid body interface to blow the debris away from the drill bit and prevent binding. However, when the hole to be drilled has a substantial length, as is the case with a blast furnace tap hole, the debris continues to build because it cannot escape the hole.

In addition, blowing off is often undesirable because the material being drilled is often a carcinogen. Therefore, the use of pressurized air is discouraged all together.

The present invention is provided to solve these and other problems.

SUMMARY OF THE INVENTION

The present invention is directed to a rotary drill bit for boring a hole through solid materials. The drill bit of the present invention has interchangeable parts and increases the rate at which a hole can be drilled.

The drill bit comprises a collar and a penetrating member. The collar is attachable at a proximal end to a drill shaft and at a distal end to the penetrating member. The collar is generally centered about a longitudinal axis and has a cylindrical shape. An inner surface of the collar defines a chamber. In addition, the inner surface is furnished with reverse or lefthand oriented threads.

The penetrating member comprises a connecting end and a cutting end. The connecting end is attachable to the distal end of the collar. The connecting end has a pair of opposing planar walls joined by a pair of opposing arcuate threaded walls. The threads on the arcuate walls are reverse oriented for attachment to the reverse threads located on the inner surface of the collar. The arcuate walls have a length less than the length of the planar walls so that the cutting end has a narrow profile.

The cutting end has a pair of spades radiating from a center point. A pilot drill for creating a pilot hole is also located at the center point. Each spade has a pentagonal cross-section. Accordingly, each spade has a base wall, opposing side walls, and a pair of angled walls that intersect to form a cutting edge.

Other advantages and aspects of the present invention will become apparent upon reading the following description of the drawings and detailed description of the invention.

BRIEF DESCRIPTION OF DRAWINGS

FIG. 1 is a cross-sectional view of a drill bit of the present invention connected to a drill shaft;

FIG. 2 is an exploded view of the cross-sectional view of FIG. 1;

FIG. 3 is a view taken along 3—3 of FIG. 1; and,

FIG. 4 is a side view of a penetrating member of a drill bit of the present invention.

DETAILED DESCRIPTION

While the invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Referring to FIG. 1, a drill bit 10 for boring a hole through a solid body is illustrated. The drill bit 10 of FIG. 1 is shown joined to a shaft 12. The drill bit 10 comprises a collar 16 removably attached to a penetrating member 20. This feature allows the collar 16 or the penetrating member 20 to be switched out depending upon the wear to that part or the type of material to be drilled.

The collar 16 is generally produced from a rigid metallic material. In the preferred embodiment, the collar 16 has a cylindrical side wall 24 centered about a longitudinal axis 28, a proximal end 32 and a distal end 36. The cylindrical side wall 24 has an inner surface 40 and an outer surface 44. The inner surface 40 defines a chamber 48 for receiving the shaft 12 at the proximal end 32 of the collar 16. The inner surface 40 is furnished with a first set of reverse screw threads 52. The reverse screw threads 52 are oriented so that a counterclockwise torque fastens and tightens the collar 16 to a corresponding screw threaded portion 56 of the shaft 12.

The penetrating member 20 comprises a cutting end 60 and a connecting end 64. The connecting end 64 has opposing planar side walls 68 joined by opposing arcuate side walls 72. The arcuate side walls 72 are furnished with screw threaded portions 76. These screw threaded portions 76 also have a reverse orientation so that the connecting end 64 can be joined to the distal end 36 of the collar 16.

In the preferred embodiment, each arcuate side wall 72 has a length which is less than the length of the planar side walls 68. FIG. 3 shows that this arrangement lends the penetrating member 20 a narrow profile 80. When the penetrating member 20 is inserted into and threadably attached to the collar 16 there are air gaps 84 on either side of the penetrating member 20 The purpose of the air gaps 84 is to allow pressurized air which travels through a passage (not shown) extending the axial length of the shaft 12. The pressurized air blows off loosened debris of the solid body created during the drilling process that, if allowed to build up, could bind the drill bit 10 as the hole is being drilled. Drill bit binding causes delays in the drilling process. Thus, by blowing off the debris and avoiding drill bit binding, the rate at which a hole can be drilled is increased.

The cutting end 60 is designed to bore through the solid body and is generally suitable for drilling through tough materials such as concrete and/or steel. The cutting end 60 comprises identical first and second spades 88 radiating from a center point 92. A pilot drill 96 is positioned at the center point 92.

The pilot drill 96 is a conical portion centered about the longitudinal axis 28. The pilot drill 96 blends into the remaining portions of the penetrating member 20 forming a smooth transition region 100. The pilot drill 96 is the first portion of the drill bit 10 to contact the solid material which is to be drilled. This pilot drill 96 penetrates the body forming an initial pilot hole and aids in guiding the drill bit 10 through the body. In other words, the pilot drill 96 acts as an anti-walk mechanism because as the pilot drill 96 enters the solid body and forms the pilot hole the remaining portions of the drill bit 10 cannot drift out of position. The anti-walk mechanism increases the rate at which a hole can be drilled because less time is wasted aligning the drill bit with the targeted drill area.

In the preferred embodiment, the spades 88 have a pentagonal cross-section. Each spade 88 has a base wall 104, a pair of side walls 108, and a pair of angled walls 112. A portion of each base wall 104 is integrally connected to the connecting end 64 of the penetrating member 20. The pair of opposing side walls 108 extend perpendicularly from the base wall 104. A portion of each side wall 108 is integrally connected and coplanar with the planar side wall of the connecting end 64 so that the penetrating member 20 maintains its narrow profile 80 at the cutting end 60. At an opposite side of the base wall 104, the angled walls 112 extend from each cutting end 60 side wall 108. The angled walls 112 form a beveled cutting surface 114 and extend upwardly and inwardly until the angled walls 112 meet forming a cutting edge 116. (See FIG. 4). Thus, the cutting edge 116 is formed by the union of the pair of angled walls 112. Thus, each spade 88 has a cutting edge 116.

The cutting edges 116 are those portions of the penetrating member 20 that perform the bulk of the drilling. The size of the hole to be bored corresponds roughly to the total length of the cutting edges 116 plus a diameter 120 of the pilot drill 96. Each cutting edge 116 extends outwardly from the center point 92 and tapers downwardly toward the base wall 104. The downwardly tapering cutting edges 116 cooperate with the pilot drill 96 to facilitate movement of the solid material and to prevent the drill bit from walking or shifting along the solid material's surface as the hole is being bored.

In the preferred embodiment, the cutting edges 116 extend beyond the outer surface 44 of the collar 16. Thus, the circumference of the hole being drilled is greater than the circumference of the collar 16. This structure cooperates with the air gaps 84 on either side of the penetrating member 20 and the pressurized air passed through passage in the shaft 12 to aid in preventing the drill bit 10 from binding up within the hole. As the pressurized air is forced through the shaft 12 and the collar 16, it is forced out the air gaps 84 and blows the debris away as the hole is being drilled. The loosened debris is expelled from the drilling area along the outer surface 44 of the collar 16.

However, the drill bit 10 of the present invention can also be employed in conjunction with a solid shaft 12 without having binding occur. Having the cutting edges 116 extend beyond the outer surface 44 of the collar 16 allows debris to be removed from the hole without the use of pressurized air. Therefore, when drilling through a known carcinogenic material, blowing is not needed to avoid drill bit 10 binding.

While a specific embodiment has been illustrated and described, numerous modifications are possible without departing from the spirit of the invention, and the scope of protection is only limited by the scope of the accompanying claims.

I claim:

1. A rotary drill bit for boring a hole through a solid body, the rotary drill bit comprising:

a collar having an inner surface provided with a first screw threaded segment and defining a chamber, an outer surface, a proximal end, and a distal end, the proximal end being attachable to an external member; and, a penetrating member having a cutting end and a connecting end threadably attachable to the distal end of the collar wherein the connecting end comprises opposing first and second screw threaded, arcuate walls separated by first and second substantially planar walls, the first and second screw threaded, arcuate walls for engaging the first screw threaded segment of the collar such that an air gap exists between an inner surface of the collar and the penetrating member.

2. The rotary drill bit of claim 1 wherein a length of the first and second screw threaded, arcuate walls is less than a length of the first and second substantially planar walls wherein a pair of air gaps are formed between the inner surface of the collar and the substantially planar walls.

3. The rotary drill bit of claim 1 wherein the penetrating member has a beveled cutting surface.

4. The rotary drill bit of claim 3 wherein the beveled cutting surface has a tapered cutting edge.

5. The rotary drill bit of claim 3 wherein the cutting surface extends beyond the outer surface of the collar.

6. The rotary drill bit of claim 1 wherein the cutting end comprises a plurality of spades.

7. The rotary drill bit of claim 6 wherein the spades originate at a center point, a pilot drill being located at the center point.

8. The rotary drill bit of claim 6 wherein each spade has a beveled cutting surface.

9. The rotary drill bit of claim 6 wherein each spade has a pentagonal shaped cross-section.

10. The rotary drill bit of claim 1 wherein the solid body to be drilled is produced from concrete.

11. The rotary drill bit of claim 1 wherein the solid body to be drilled is produced from steel.

12. A rotary drill bit for boring a hole through a solid body, the rotary drill bit comprising:

a substantially cylindrical collar; and, a penetrating member having a cutting end and a connecting end, the cutting end having a plurality of spades radiating from a center point and a pilot drill located at the center point, each spade having a beveled cutting surface with a tapered cutting edge, the connecting end comprising opposing first and second arcuate walls separated by first and second opposing planar walls and being attachable to the collar.

13. The rotary drill bit of claim 12 wherein the first and second arcuate walls have a length less than a length of the first and second opposing substantially planar walls wherein the penetrating member has a narrow profile.

14. The rotary drill bit of claim 12 wherein the cutting end extends beyond the outer surface of the collar.

15. The rotary drill bit of claim 12 wherein each spade has a pentagonal shaped cross-section.

* * * * *